US011544048B1

(12) United States Patent
Ravindran

(10) Patent No.: US 11,544,048 B1
(45) Date of Patent: Jan. 3, 2023

(54) AUTOMATIC CUSTOM QUALITY PARAMETER-BASED DEPLOYMENT ROUTER

(71) Applicant: West Corporation, Omaha, NE (US)

(72) Inventor: Sarath Kumar Ravindran, Omaha, NE (US)

(73) Assignee: INTRADO CORPORATION, Omaha, NE (US)

( * ) Notice: Subject to any disclaimer, the term of this patent is extended or adjusted under 35 U.S.C. 154(b) by 0 days.

(21) Appl. No.: 16/353,887

(22) Filed: Mar. 14, 2019

(51) Int. Cl.
| | | |
|---|---|---|
| G06F 9/44 | (2018.01) | |
| G06F 11/36 | (2006.01) | |
| G06F 9/445 | (2018.01) | |
| G06F 8/60 | (2018.01) | |
| H04L 67/00 | (2022.01) | |
| H04L 67/51 | (2022.01) | |

(Continued)

(52) U.S. Cl.
CPC ............ G06F 8/60 (2013.01); G06F 11/3692 (2013.01); H04L 67/34 (2013.01); G06F 8/35 (2013.01); G06F 8/61 (2013.01); G06F 8/64 (2013.01); G06F 8/65 (2013.01); G06F 8/70 (2013.01); G06F 8/71 (2013.01); G06F 11/3608 (2013.01); G06F 11/3664 (2013.01); G06F 11/3668 (2013.01); G06F 11/3672 (2013.01); G06F 11/3676 (2013.01); G06F 11/3684 (2013.01); G06F 11/3688 (2013.01); H04L 67/10 (2013.01); H04L 67/51 (2022.05)

(58) Field of Classification Search
CPC .... G06F 11/3668; G06F 11/3688; G06F 8/60; G06F 8/71; G06F 8/64; G06F 8/61; G06F 8/35; G06F 8/70; G06F 11/3608; G06F 11/3006; G06F 11/36; G06F 11/3664; G06F 11/3684; G06F 11/3692; G06F 11/26; G06F 8/65; G06F 8/38; G06F 8/10; G06F 8/37; G06F 8/30; G06F 8/41; G06F 8/20; G06F 8/75; G06F 8/77; G06F 8/4452; G06F 11/3676; G06F 11/368; G06F 11/302; G06F 11/3672; G06F 11/3696; H04L 67/10; H04L 67/16; H04L 67/34; H04L 67/51
See application file for complete search history.

(56) References Cited

U.S. PATENT DOCUMENTS

| | | | |
|---|---|---|---|
| 8,843,877 B2 * | 9/2014 | Dutta ........................ | G06F 8/10 717/101 |
| 9,122,804 B2 * | 9/2015 | Rhoads .................... | G06F 8/60 |

(Continued)

OTHER PUBLICATIONS

Michael R. Lyu et al., An Empirical Study on Testing and Fault Tolerance for Software Reliability Engineering, 2003 IEEE, [Retrieved on Aug. 17, 2022], Retrieved from the internet: <URL: https://ieeexplore.ieee.org/stamp/stamp.jsp?tp=&arnumber=1251036> 12 Pages (1-12) (Year: 2003).*

Primary Examiner — Anibal Rivera

(57) ABSTRACT

An example method of operation may include automatically receiving information from a storage area in response to a signal, which information may include test results for a computer product evaluated by a plurality of test stages. The method may also include retrieving deployment parameters for the computer product, determining whether the test results satisfy the deployment parameters for the computer product, and automatically authorizing deployment of the computer product based on whether the test results satisfy the deployment parameters.

19 Claims, 6 Drawing Sheets

(51) Int. Cl.
    *G06F 8/71* (2018.01)
    *G06F 8/61* (2018.01)
    *G06F 8/35* (2018.01)
    *H04L 67/10* (2022.01)
    *G06F 8/70* (2018.01)
    *G06F 8/65* (2018.01)

(56) References Cited

U.S. PATENT DOCUMENTS

| | | | |
|---|---|---|---|
| 10,503,496 B2* | 12/2019 | Natari | G06F 8/71 |
| 10,581,717 B2* | 3/2020 | Tejaprakash | H04L 43/04 |
| 10,642,599 B1* | 5/2020 | Killmon | G06F 8/65 |
| 2010/0125618 A1* | 5/2010 | Dutta | G06F 8/10 |
| | | | 707/822 |
| 2014/0344788 A1* | 11/2014 | Rhoads | G06F 8/60 |
| | | | 717/126 |
| 2014/0372989 A1* | 12/2014 | Shani | G06F 8/70 |
| | | | 717/131 |
| 2017/0003948 A1* | 1/2017 | Iyer | H04L 43/045 |
| 2017/0357927 A1* | 12/2017 | Antonio | G06F 40/284 |
| 2017/0372247 A1* | 12/2017 | Tauber | G06F 11/3668 |
| 2019/0104047 A1* | 4/2019 | Tejaprakash | H04L 41/22 |
| 2019/0129712 A1* | 5/2019 | Hawrylo | G06F 8/20 |
| 2019/0171550 A1* | 6/2019 | Eizenman | G06F 11/3664 |
| 2019/0196950 A1* | 6/2019 | Ranganathan | G01R 31/31835 |
| 2019/0243640 A1* | 8/2019 | Natari | G06F 8/60 |
| 2019/0258464 A1* | 8/2019 | Wells | G06F 8/35 |
| 2019/0266076 A1* | 8/2019 | Maliani | G06F 11/3692 |
| 2019/0294428 A1* | 9/2019 | Scheiner | G06F 8/65 |

* cited by examiner

AUTOMATIC CUSTOM QUALITY PARAMETER-BASED DEPLOYMENT ROUTER

TECHNICAL FIELD OF THE APPLICATION

This application relates to deployment of a computer product or software.

BACKGROUND OF THE APPLICATION

The development of applications and other computer products is central to the business plans of many companies. Before an application or product is released, it is often tested to ensure that it satisfies quality and compliance standards.

One approach for testing an application is performed on a stage-by-stage basis. Each stage of testing is performed by different personnel. As a result, it is difficult for personnel at subsequent stages of testing to determine and track the testing scripts, results, and parameters used in prior stages.

Also, changes made to the application in a prior stage may be missed or difficult to track by personnel at subsequent stages. Even worse, these changes may negatively affect performance of the application and/or make the application unsuitable for testing at a subsequent stage. This is especially true when stages test for quality and compliance across different platforms or operating systems.

Moreover, the decision to deploy a tested application is made using a decentralized process, often requiring managing personnel to access testing results from each stage and then make a judgment call as to whether deployment should be made. Such a decentralized process is cumbersome to implement and produces inaccurate results, e.g., applications which are not ready to be deployed are deployed for lack of an objective way of obtaining and evaluating testing results at each stage.

These and other drawbacks have made existing methods for performing quality assurance testing costly and inefficient, often resulting in extending the target release date for an application.

SUMMARY OF THE APPLICATION

Example embodiments of the present application provide a method to control automatic deployment of a product, which method includes automatically receiving information from a storage area in response to a signal. The information includes test results for a computer product evaluated by a plurality of test stages. The method further includes retrieving deployment parameters for the computer product, determining whether the test results satisfy the deployment parameters for the computer product, and automatically authorizing deployment of the computer product based on whether the test results satisfy the deployment parameters.

Another example embodiment may include an apparatus to control automatic deployment of a product, which apparatus includes a memory to store deployment parameters, a receiver configured to receive information from a storage area in response to a signal, where the information includes test results for a computer product evaluated by a plurality of test stages, and a deployment router configured to determine whether the test results satisfy the deployment parameters stored in the memory for the computer product and automatically authorize deployment of the computer product based on whether the test results satisfy the deployment parameters.

Another example embodiment may include a non-transitory computer readable storage medium configured to store instructions that when executed cause a processor to perform at least one of automatically receiving information from a storage area in response to a signal, the information including test results for a computer product evaluated by a plurality of test stages, retrieving deployment parameters for the computer product, determining whether the test results satisfy the deployment parameters for the computer product, and automatically authorizing deployment of the computer product based on whether the test results satisfy the deployment parameters.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, the term "computer" as used herein may refer to any type of computing device capable of running applications or other software. The computing device may be a notebook, laptop, or desktop computer operating on a stand-alone or network-connected basis, a server, a console, or any one of a number of mobile devices including but not limited to a personal digital assistant, cell phone, tablet, smartphone, television, monitor, camera, security device, home system controller, appliance, navigation device, gaming system, or another computing device, or combination of devices. In addition, the term "computer product" may be any type of hardware or software run on, operated by, or coupled to a computer.

Figure 1:
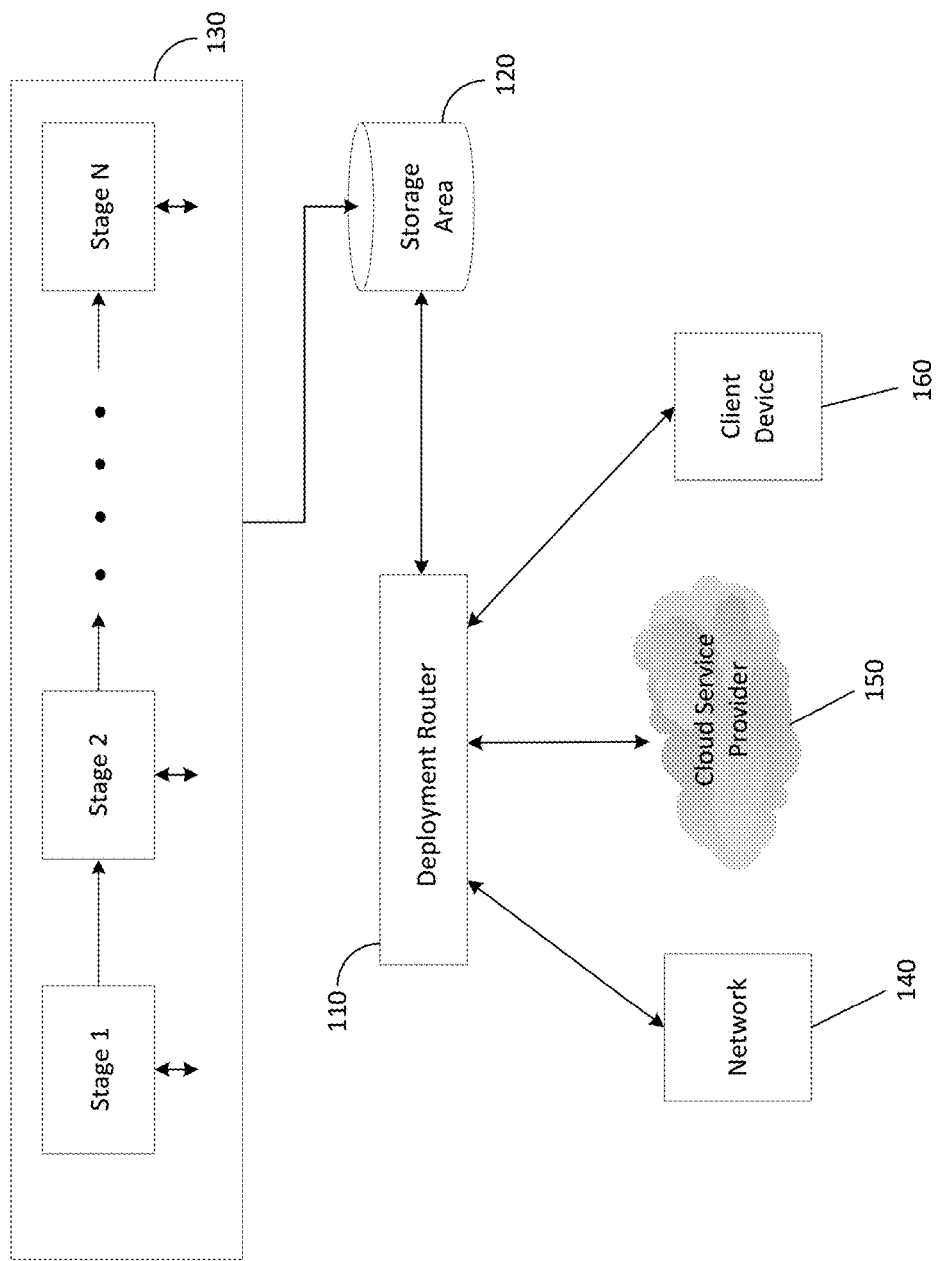
FIG. 1 shows an embodiment of an apparatus to control automatic deployment of a product.

FIG. 1 shows an embodiment of an apparatus 100 to control automatic deployment of a product. The product may be a computer product or another type of product (hardware, software, or a combination) subject to quality and assurance testing prior to release. For illustrative purposes, the product will be discussed as a computer product in the form of an application, Referring to FIG. 1, the apparatus 100 includes a deployment router 110 coupled to a storage area 120. The deployment router 110 includes logic to automatically render a decision as to whether the application is to be deployed. The logic makes this decision based on information stored in the storage device 120 and a custom set of deployment parameters identified and selected, for example, by a leadership or application quality assurance group. The custom parameters in the deployment router may be, for example, predetermined information (e.g., patterns, ranges, waveforms, values, or other data) to be used in determining deployment. The parameters may be updated, modified, or changed to change the level of quality that is deemed to be acceptable for deployment.

The storage area 120 stores information corresponding to the parameters used by the logic of the deployment router 110. This stored information may be information received during a quality and assurance testing process. The information may be received from respective ones of a plurality of stages used to test and measure the quality of the application. The custom parameters stored in the deployment router and the information stored in the storage area may differ based on the type of application. The storage area 120 may be (or be included in) a buffer, memory, database, or other information storage.

The plurality of stages 130 may differ with respect to the type of application being tested. For illustrative purposes, N stages have been shown, where each stage tests a different aspect of the application. For example, stage 1 may test the performance and compatibility of the application in a first operating system, while stage 2 may test the performance and compatibility of the application in a second operating system. The operating systems may be, for example, a cloud-based operating system, a mobile device operating system, an Android operating system, Apple operating system, etc. Other stages may test the compatibility of the application to different browser platforms (e.g., Chrome, Safari, Explorer, Mozilla, etc.). Other stages may test the application at the code level to determine whether any errors exist. Still other stages may test other features or aspects of the application, as determined, for example, as pre-conditions to deployment.

Each of the stages 130 may be include programs which automatically test the application as received from a developer or previous stage. The automatic test may be performed based on inputs, data, and/or other information considered pertinent to testing a certain aspect or performance of the application. The inputs, data, and/or other information may be determined beforehand, for example, by system testers or developers, and may be changed as needed to change the type and nature of the tests.

During testing, each stage 120 may send, in real-time, results of the test to the storage area 120. Additionally, or alternatively, the test results may be sent to the storage area 120 after the test has been completed. Then, programming instructions and logic in each stage may automatically send the application to a subsequent stage for additional testing. This may be accomplished, for example, through application programming or other interfaces situated between adjacent ones of the stages that adhere to specific communication protocols. Thus, in one embodiment, the stages may be part of a continuous integration and continuous delivery (CICD) tool, where the stages are linked by a system network.

Once the final stage has sent its test results to the storage area 120, a signal may be sent (e.g., by the logic of the final stage) to the deployment router 110, so that the deployment router may automatically make a deployment decision for the application. This may involve retrieving from the storage area 120 information output from the stages and then determining whether that information meets certain requirements.

Thus, in one embodiment, the entire process for testing the application, from submission by the developer to generation of the deployment decision, may be performed automatically and without human intervention. As a result, the entire deployment process may be efficiently implemented with no delays, thereby saving costs and assuring that target release dates will be met.

Once the deployment router 110 has made a favorable deployment decision, the application may be released to one or more destinations for access and use by clients or customers. For example, the application may be deployed to a predetermined network 140 (e.g., the Internet, a private client network, etc.) or a cloud service provider 150 (e.g., App Store, Google Play, Amazon, etc.). In one embodiment, the application may be deployed directly to a client device 160.

When the deployment router 110 determines that deployment is not appropriate (because, for example, the information accessed from storage area 120 indicates that the application in its current state is unsuitable for deployment), a notification signal may be generated by the deployment router 110. The notification signal may include information indicating, for example, that the application has failed quality testing and the reason for the failure. In one embodiment, the notification signal may include link or other information pointing to a report providing specific details of the failure and/or other information received from the stages during testing. The report may be generated, for example, by a system processor or a processor or other logic of the deployment router. The notification signal may be sent, for example, to the developer and/or other personnel responsible for making modifications to the application.

At any point during the testing, the application may be updated or modified to correct or change a result of the test obtained for that stage. This may be performed automatically by a program in the stage or with the assistance of a developer.

Figure 2:
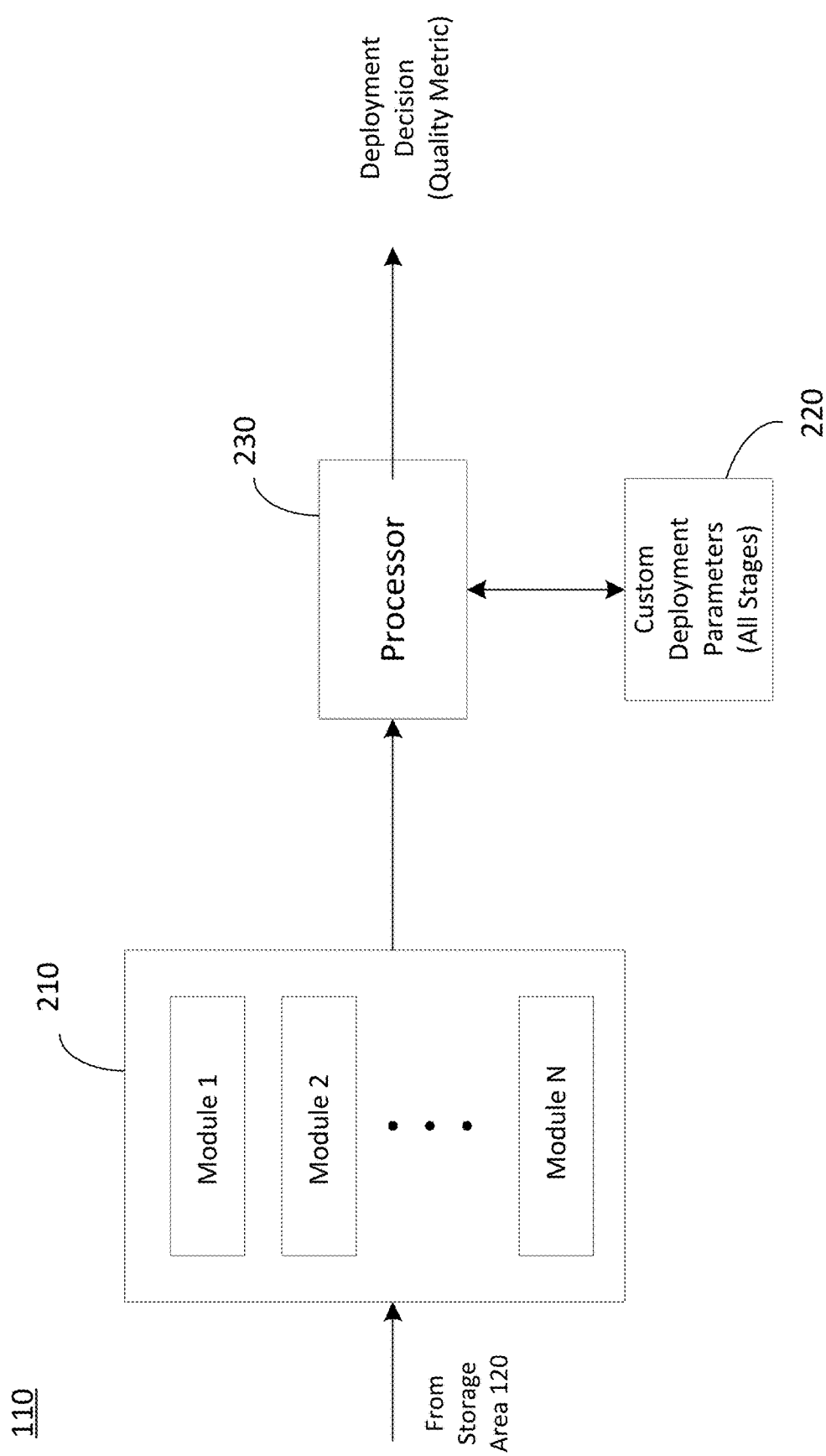
FIG. 2 shows an embodiment of a deployment router.

FIG. 2 shows an embodiment of the deployment router 110 including a module unit 210, a storage area 220, and a processor 230. The module unit 210 includes a plurality of modules $210_1, 210_2, \ldots 210_N$, one for each of the N stages 130 used for testing the quality of the application. Each module retrieves information from the storage area 120 that was output from a corresponding one of the N stages during testing. Retrieval of this information may be performed in response to a notification signal, e.g., output from the stage N, indicating that testing has been completed. The modules then pass this information to the processor 230 for evaluation. The information from the modules $210_1, 210_2, \ldots 210_N$ may be passed to the processor 230 at once or sequentially. The modules may be any type of logic, program, script, or software.

The storage area 220 stores custom deployment parameters for each of the N stages. The custom deployment parameters may include patterns, ranges, waveforms, values, or other data that are to be satisfied before the application may be determined to be acceptable for deployment.

The parameters in storage area 220 may be changed at any time in order to change the requirements for deployment.

The processor 230 determines whether the information received from the module unit 210 satisfies the requirements for deployment based on the custom parameters in the storage area 220. This may be accomplished in various ways. For example, based on control software or other logic, the processor 230 may determine that deployment is to be performed only when all of the custom deployment parameters are satisfied by the information received from the module unit 210.

In another embodiment, the processor 230 may determine that deployment is to be performed when fewer than all (e.g., preselected ones of) the custom parameters are satisfied. Satisfaction of the custom parameters may occur, for example, when the information received from the modules falls within a predetermined range of values or meet certain other requirements. Either way, the processor 230 outputs a deployment decision, which may or may not include a metric providing a score of how well the custom parameters have been satisfied. In another embodiment, the deployment decision may merely indicate pass or fail for deployment of the application.

When deployment fails, the processor 230 may issue a notification to a software developer, who may then modify the code of the application and re-submit the application into the process flow to determine deployment once again.

Figure 3:
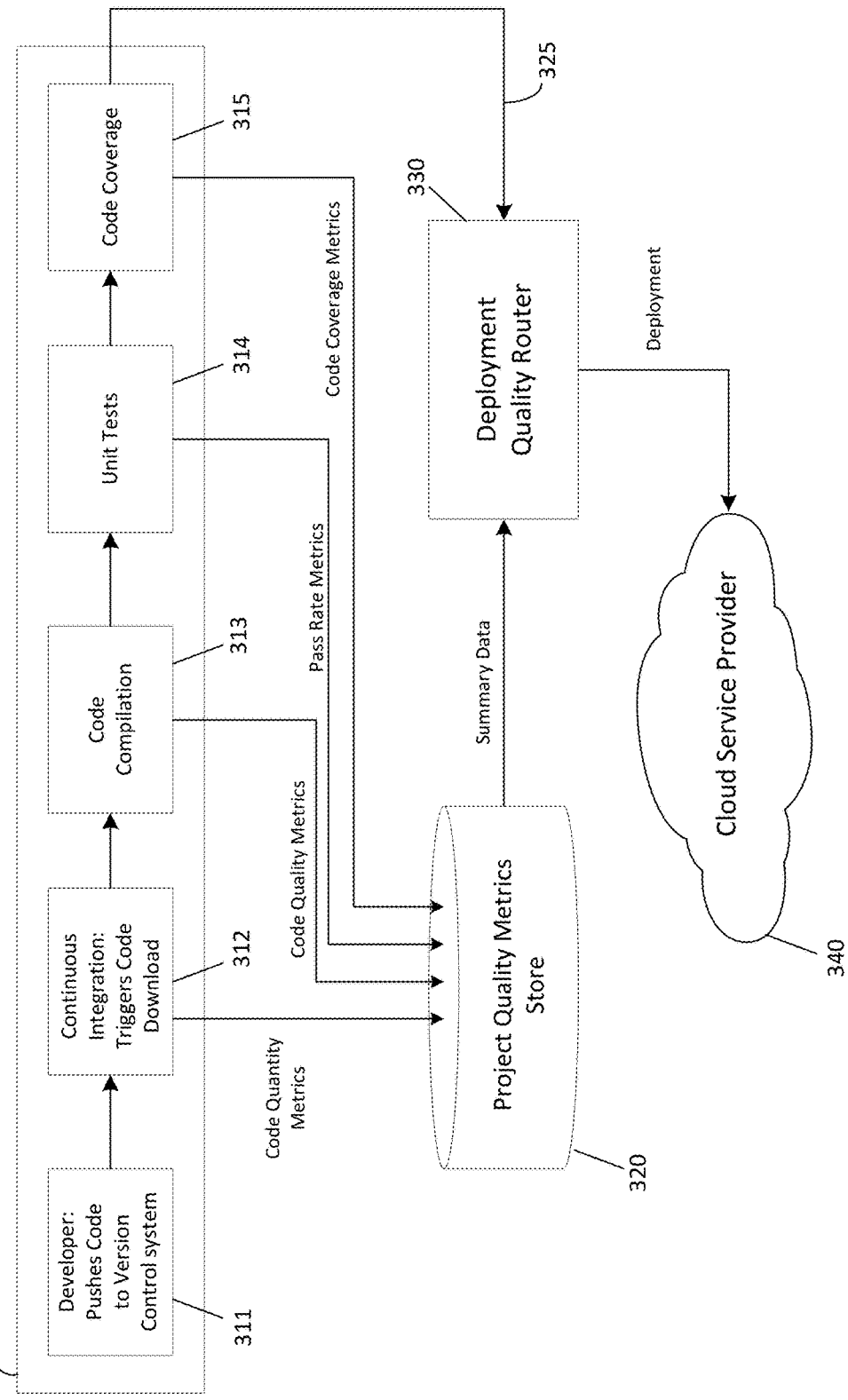
FIG. 3 shows an embodiment of a method to control automatic deployment of a product.

FIG. 3 shows another embodiment of an apparatus 300 to perform automatic deployment of a product. The product may be a computer product or another product. For purposes of describing apparatus 300, a computer product in the form of an application will be discussed.

The apparatus 300 is coupled to a continuous integration and continuous delivery (CICD) section 310 and includes a project quality metrics store 320, and a deployment router 330.

The continuous integration and continuous deliver section 310 includes a plurality of stages. An initial stage is a developer stage 311 where a software developer inputs, e.g., through an appropriate application programming interface (API), the application to be tested into the process flow of the apparatus. In one embodiment, the developer pushes the code of the application to a version control system, e.g., a software tool that helps the developer manage code of an application. For example, the version control system may track modifications to the code in a database, and more store earlier versions of the code for recovery, error detection, or other purposes.

Once the code of the application has been pushed to the version control system, a program of the initial stage 310 automatically triggers process flow to a continuous integration stage 312. A program at this stage triggers download of the code of the application, that was pushed to the version control system, and a continuous integration process is performed.

During continuous integration, a build is started on a build server and tests are immediately and automatically performed on the application. The tests may determine the quality of the build, for example, by running configured smoke and integrated tests in a deployed, realistic environment. The tests are designed to find defects, if any, in the application or its code as soon as they are introduced. The test results (including code quantity metrics) are then sent to the project quality metrics store, where it is maintained until accessed by the deployment quality router. Once the test results are sent from the continuous integration stage to the project quality metrics store 320, a program in stage 312 automatically passes control to a code compilation stage 313.

The code compilation stage 313 compiles the code of the application to locate compiling errors, if any. The code compilation test may be performed by various types of compilers depending, for example, on the computing language used for the application. The results of the compilation test are sent as a code quality metric from the code compilation stage 313 to the project quality metrics store 320, and a program in stage 313 automatically passes control to a unit test stage 314.

The unit test stage 314 may test individual units of code of the application to determine whether they operate properly. The units of code may be sets of one or more computer program modules along with associated control data, usage procedures, and/or operating procedures. In one embodiment, the unit test stage 314 may test individual classes or functions of the application. When the classes or functions are to access external resources, the resources may be provided as mocks or stubs. During the test and/or after completion, the unit test stage 314 sends pass rate metrics to the project quality metrics store 320, and then a program in stage 314 automatically passes control to code coverage stage 315.

The code coverage stage 315 determines what percentage of code of the application is used when certain predetermined tests are run. A program with high test coverage may indicate that more of the code of the application was executed during testing, which suggests that there is a lower chance of containing undetected software bugs compared to a program with low test coverage. When the test is completed, the code coverage stage sends code coverage metrics to the project quality metrics store 320.

In this example embodiment, the code coverage stage 315 is the last stage in the CICD process flow. In this case, a program in the code coverage stage 315 may automatically send a notification signal 325 to the deployment quality router 330 indicating that a deployment decision concerning the application should now be performed.

The deployment quality router 30 may request the project quality metrics store 320 to output all testing information and results obtained by the CICD stages. This may be accomplished, for example, through the module units in FIG. 2. In one embodiment, the project quality metrics store may automatically send the testing information and results to the deployment quality router in response to the notification signal received from the code coverage stage, e.g., the last stage in the CICD process flow. In either case, store 320 sends the testing information and results (e.g., summary data) to the router 330 for a deployment determination.

The deployment quality router 330 may automatically determine whether the application submitted by the developer in stage 311 should be deployed. This determination may be made, for example, in the manner shown in FIG. 2, where the router includes a processor 230 that automatically determines whether the summary data received from the project quality metrics store satisfies custom deployment parameters determined beforehand. When the processor 230 determines that deployment is successful, the application is deployed, in this example, case, to a cloud server provider 340.

Figure 4A:
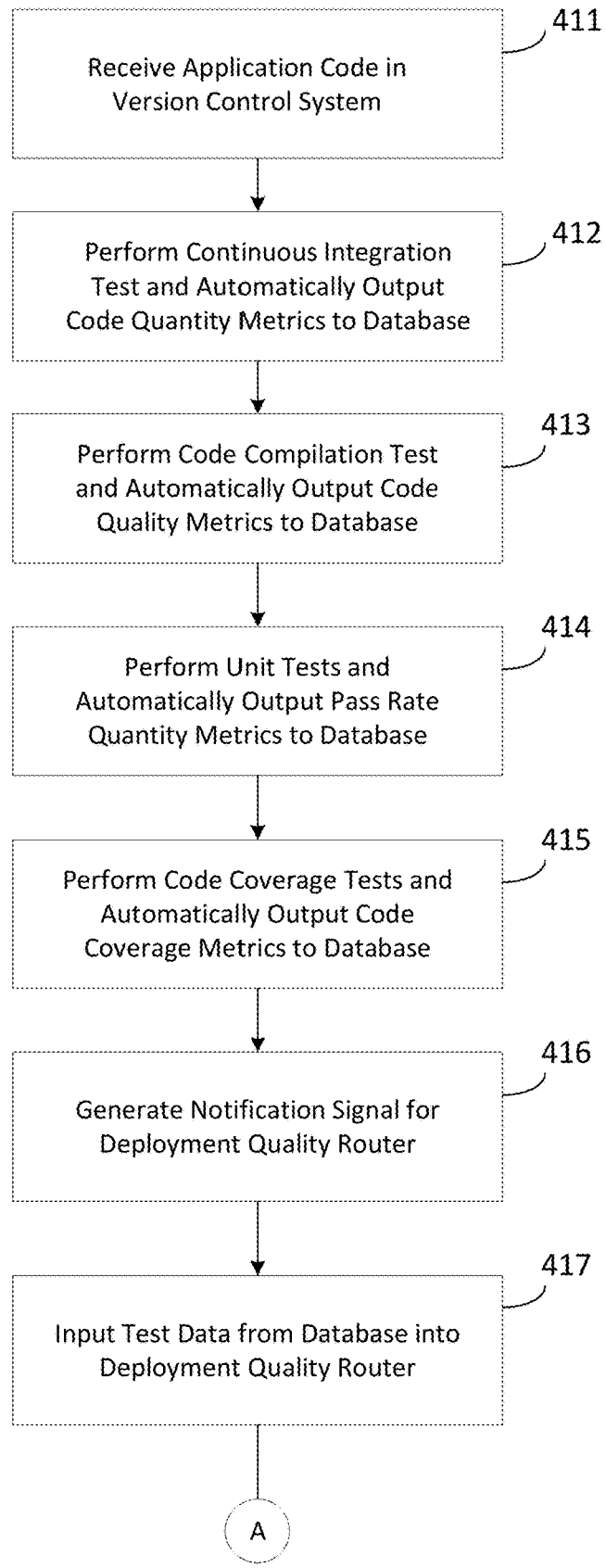
FIGS. 4A and 4B show an embodiment of a method to control automatic deployment of a product.
Figure 4B:
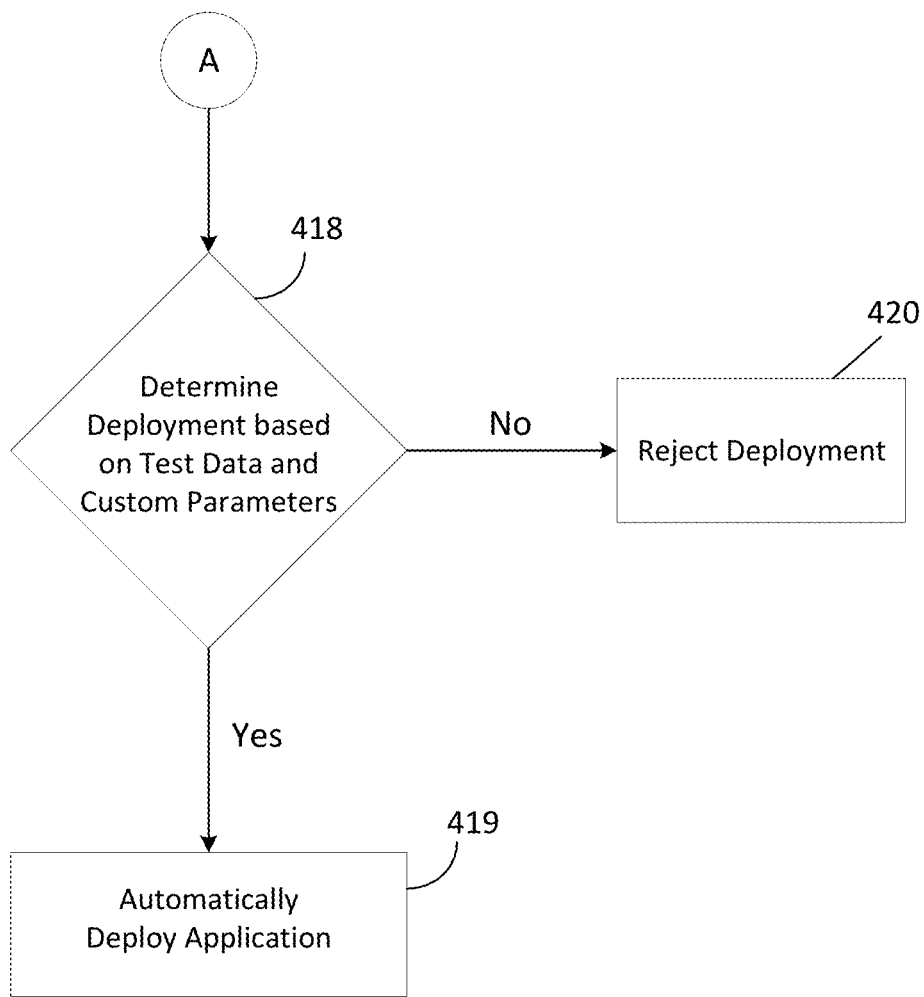

FIGS. 4A and 4B show operations included in an embodiment of a method 410 to control automatic deployment of a product. The method may be, but is not necessarily, performed by the apparatus, system, and computer-readable medium embodiments described herein. Like in the previous embodiments, the product is assumed to be a computer product such as an application. The product may be different from an application or computer product in another embodiment.

Referring to FIGS. 4A and 4B, the method includes, at 411, receiving code of an application into a version control system and then automatically passing control to a continuous integration stage. As previously indicated, this may be performed by a system control program using, for example, an application programming interface. Once the code is in the version control system, control is automatically passed to a next stage in process flow, which, for example, may be a continuous integration stage.

At 412, continuous integration is performed which initially involves triggering download of the code from the version control system. The download may be triggered, for example, by one or more integration tools which allow the application and its attendant code to be tested. The integration tools may be triggered, for example, by a control signal received from the developer stage after the code for the application has been pushed into the version control system.

During continuous integration, a build is started on a build server and tests are immediately and automatically performed on the application. The tests may determine the quality of the build, for example, by running configured smoke and integrated tests in a deployed, realistic environment. Other tests may include running test scripts for the purpose of determining performance and defects of the code in various scenarios and application programming interfaces. If any changes are made to the code to correct detected defects, then regression testing may be performed to determine whether any change or addition made to the code has caused other areas of the code to malfunction, whether any bugs have been accidentally introduced into the new build, or whether any changes to the code have made components fail that previously operated properly.

Operation 412 also includes automatically sending the test results (including code quantity metrics) to a database (e.g., the project quality metrics store), where it is maintained until accessed by a deployment quality router. Communication between the continuation integration resources (e.g., tools) and the database may be managed, for example, by an application programming interface or enterprise application integration software. Once the code quantity metrics are sent to the database, control is automatically passed to a next stage in process flow, which, for example, may be a code compilation stage.

At 413, a test is performed to compile the code of the application in order to determine whether there are any compilation errors. The test may be performed using various compiling tools. When the tests are completed, code quality metrics are sent from the code compilation tool to the database storing the metrics output from the other stages. Once the code quality metrics are sent to the database, control is automatically passed to a next stage, which, for example, may be a unit tests stage.

At 414, unit tests are performed for the application code. For example, the application may be divided into multiple testable units, which, for example, may be a program, function, method, or procedure of the application. The units may be individually tested, by a software tool. In one embodiment, unit testing frameworks, drivers, stubs, and mock/fake objects may be used to assist in unit testing. When the tests are completed, pass rate metrics are sent from the unit tests tool to the database storing the metrics output from the other stages. Once the pass rate metrics are sent to the database, control is automatically passed to a next stage in process flow, which, for example, may be a code coverage stage.

At 415, code coverage tests are performed for the application to determine, for example, what percentage of code has been used when various functions, methods, or procedures of the application are executed. In addition, the code coverage tests may determine test case overlap and which test cases can be combined or deleted, what additional tests need to be run (especially when a code change has been performed), and what code produced defects or bugs. As with the tests implemented in other stages of the process flow, predetermined scripts and data may be used to perform the tests in order to gather useful metrics that will form a basis for determining automatic deployment. When the tests are complete, the code coverage stage may automatically output code coverage metrics for storage in the database.

The order of stages in the continuous integration and continuous delivery (CICD) section (e.g., see FIG. 3) of the process flow may be different in other embodiments. For example, in one embodiment, the code compilation may be performed before continuous integration, or the unit tests may be performed at a different location in the process flow. In the embodiment shown in FIG. 3, the code coverage stage is the last stage in the CICD flow.

At 416, when the last stage (code coverage stage) automatically outputs the code coverage metrics to the database, the database is in a state where enough information is stored to allow a deployment decision to be made. At this time, the code coverage stage, or control software of the database, may automatically generate a notification signal for output to a deployment quality router, e.g., 330 in FIG. 3. The notification signal indicates that the router may now make a decision concerning deployment of the application.

At 417, the database outputs a summary of the testing data output from the stages in the CICD process flow. This data may be output automatically, for example, in response to the testing data received from the last stage (e.g., code coverage stage). In one embodiment, the signal including the code coverage metrics may include a flag or data in a predetermined field indicating that testing has been completed and that the test data is to be automatically output to the deployment quality routers. In another embodiment, the router may send a request signal to the database, in response to a notification signal received from the last stage, requesting the test data from the database.

At 418, the router determines whether the test data received from the database complies with custom deployment parameters that have been pre-stored for access by the router. The custom deployment parameters may be, for example, ranges, values, waveforms, patterns, or other information set by software developers for defining when an application is in an appropriate state where it can be deployed.

In one embodiment, for example, the deployment quality router may determine whether the test data received from the database lies within respective predetermined ranges of the custom deployment parameters. If all or a portion of the data are within range, then, at 419, control software of the deployment router may authorize deployment. In this case, the router may deliver the application to a network, cloud service provider, or client device, or a combination of these.

In one embodiment, the router may generate a metric indicative of the quality or state of the application in view of the test data and custom deployment parameters. Such a metric may be weighted in terms of different levels of importance or priority of the parameters. For example, the test data from some stages may have greater importance (in terms of making a deployment decision) than test data from other stages, and thereby may be appropriately weighted. The metric generated by the router may compute values based on these weights in view of whether or not the test data lie in respective ranges of the custom deployment parameters. The final computed metric may then itself be compared to a predetermined range and then the router may automatically determine whether deployment of the application is to be performed. In other embodiments, the router may authorize deployment only if all test data satisfies the custom deployment parameters.

If all or a portion of the data is out of range or the conditions for deployment are otherwise not satisfied, then, at 420, the router may reject deployment. In this case, the software developers may manually analyze the test data stored in the database, make changes to the application code, and then re-submit the application through the CICD process flow to determine whether the application should be deployed in view of the changes.

The present embodiments may therefore completely automate the deployment process for an application, from the initial push of the application into the version control system to the decision to deploy and actual delivery of the application to clients and customers. Moreover, through the use of appropriate application programming interfaces and integration software, each stage may automatically download its test data to the database (project quality metrics store) and output flow control to a next stage in the CICD process.

The only time manual input may be required is when deployment is rejected by the deployment router. As a result, the overall software development and deployment process is made to be less costly and more efficient, which, in turn, drastically reduces delays in the release of the application.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example network element 600, which may represent any of the above-described network components of the other figures.

Figure 5:
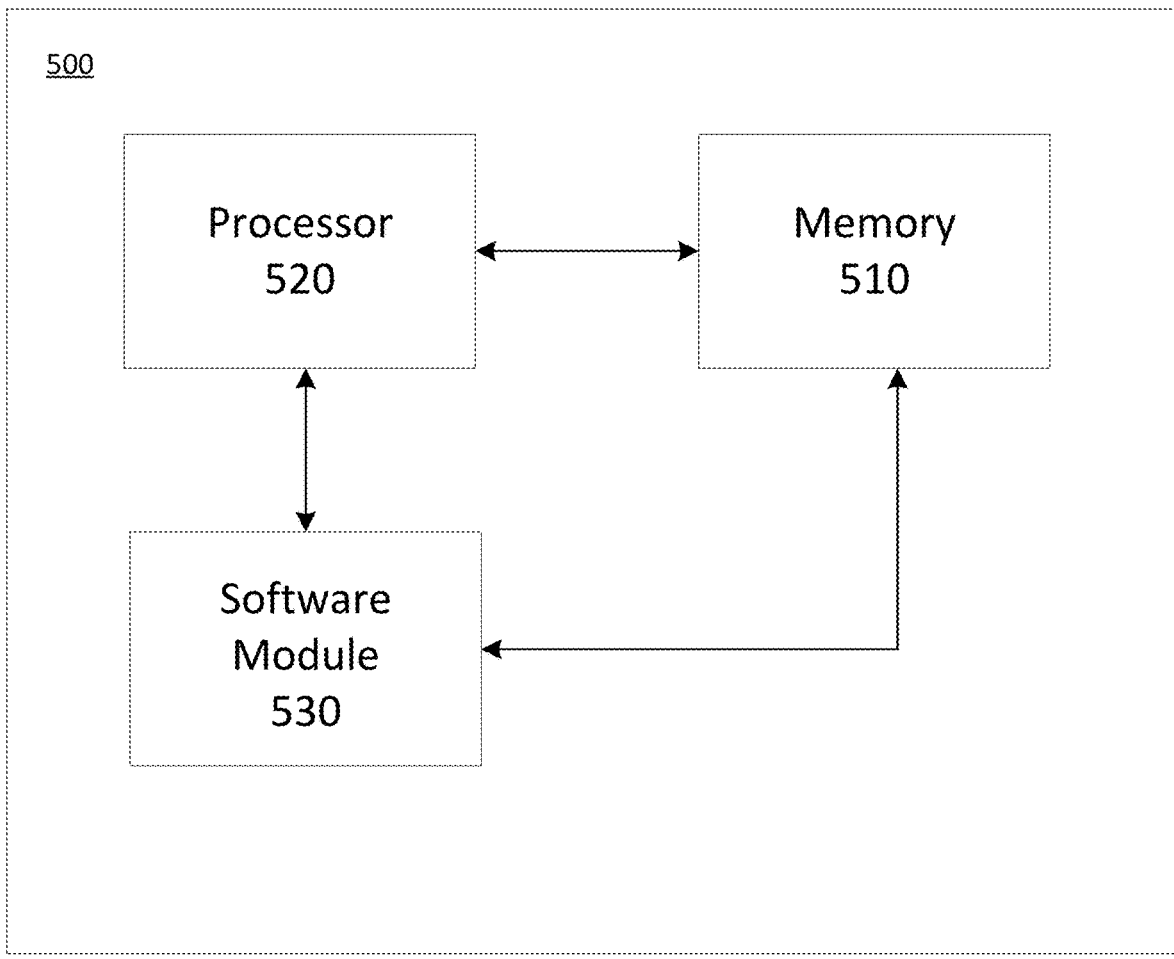
FIG. 5 shows an embodiment of a system that may implement the method embodiments.

As illustrated in FIG. 5, a memory 510 and a processor 520 may be discrete components of a network entity 500 that are used to execute an application or set of operations. The application may be coded in software in a computer language understood by the processor 520, and stored in a computer readable medium, such as, the memory 510. The application may be control software including instructions for causing the processor 520 to perform operations of the embodiments described herein. For example, the processor 520 may correspond to the processor of the deployment router and the memory 510 may store a control program and logic for controlling processor 520 to determine whether deployment of an application should be performed.

The computer readable medium may be a non-transitory computer readable medium that includes tangible hardware components in addition to software stored in memory. Furthermore, a software module 530 may be another discrete entity that is part of the network entity 500, and which contains software instructions that may be executed by the processor 520. In addition to the above noted components, the network entity 500 may have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules.

Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The processors, routers, and other processing features of the embodiments disclosed herein may be implemented in logic which, for example, may include hardware, software, or both. When implemented at least partially in hardware, the processors, controllers, routers, and other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the processors, routers, and other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods herein.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   automatically receiving, by a router, information including test results for a computer product evaluated by a plurality of test stages automatically implemented in a sequential pattern, where a test result from a test implemented by each corresponding test stage, of the plurality of test stages, is output from the corresponding test stage to a database, as the test is completed, wherein the information includes a percentage of a total code of the computer product that is used when executing a test stage of the plurality of test stages;
   automatically retrieving, by the router, deployment parameters for the computer product, wherein the deployment parameters comprise at least one range of values;
   automatically determining whether the test results satisfy a portion of the deployment parameters for the computer product;
   generating a weight of an importance of each of the plurality of test stages and a score corresponding to how well the portion of the deployment parameters were satisfied; and
   automatically authorizing deployment of the computer product based on whether the test results satisfy the portion of the deployment parameters, and when the weight of the importance of each of the plurality of test stages falls within a predetermined range of values and when the score is a passing score necessary for the deployment.

2. The method of claim 1, further comprising:
   storing the information including the test results in a storage area when the test results are received by the plurality of test stages.

3. The method of claim 1, further comprising:
   automatically determining that a change in one section of code of the computer product performed to correct a defect has caused at least one of the following:
     another section of code of the computer product to malfunction;
     a bug into another code section of the computer product;
     one or more components of the computer product to fail that operated properly prior to the changed in the one section of code; and automatically determining failure of deployment of the computer product based on the algorithm.

4. The method of claim 1, further comprising:
automatically rejecting deployment of the computer product when the test results fail to satisfy the deployment parameters.

5. The method of claim 1, wherein the computer product is an application.

6. The method of claim 1, wherein the information includes one or more of:
a metric from a continuous integration stage, a metric from a code compilation stage, a metric from a unit test stage, and a metric from a code coverage stage.

7. The method of claim 5, further comprising:
automatically deploying the application to an entity when deployment is automatically authorized, wherein the entity is a cloud service provider, a network, or a client device.

8. An apparatus, comprising:
a memory to store one or more instructions; and
a processor that when executing the one or more instructions is configured to:
receive information from a storage area in response to a signal, the information including test results for a computer product evaluated by a plurality of test stages automatically implemented in a sequential pattern, where a test result from a test implemented by each corresponding test stage, of the plurality of test stages, is output from the corresponding test stage to a database, as the test is completed, wherein the information includes a percentage of a total code of the computer product that is used when executing a test stage of the plurality of test stages,
retrieve deployment parameters for the computer product, wherein the deployment parameters comprise at least one range of values, and
automatically determine whether the test results satisfy a portion of the deployment parameters stored in the memory for the computer product,
generate a weight of an importance of each of the plurality of test stages and a score corresponding to how well the portion of the deployment parameters were satisfied, and
automatically authorize deployment of the computer product based on whether the test results satisfy the portion of the deployment parameters, and when the weight of the importance of each of the plurality of test stages falls within a predetermined range of values and when the score is a passing score necessary for the deployment.

9. The apparatus of claim 8, wherein the deployment router is configured to:
automatically determine that a change in one section of code of the computer product performed to correct a defect has caused at least one of the following:
another section of code of the computer product to malfunction,
a bug into another code section of the computer product, and
a component of the computer product to fail that operated properly prior to the changed in the one section of code.

10. The apparatus of claim 8, wherein the deployment router is configured to:
automatically reject deployment of the computer product when the test results fail to satisfy the deployment parameters.

11. The apparatus of claim 8, wherein the computer product is an application.

12. The apparatus of claim 8, wherein the information includes one or more of:
a metric from a continuous integration stage, a metric from a code compilation stage, a metric from a unit test stage, and a metric from a code coverage stage.

13. The apparatus of claim 11, wherein the application is deployed to an entity when deployment is automatically authorized, wherein the entity is a cloud service provider, a network, or a client device.

14. A non-transitory computer readable storage medium configured to store one or more instructions that when executed by a processor cause the processor to:
automatically receive information including test results for a computer product evaluated by a plurality of test stages automatically implemented in a sequential pattern, where a test result from a test implemented by each corresponding test stage, of the plurality of test stages, is output from the corresponding test stage to a database, as the test is completed, wherein the information includes a percentage of a total code of the computer product that is used when executing a test stage of the plurality of test stages;
automatically retrieve deployment parameters for the computer product, wherein the deployment parameters comprise at least one range of values;
automatically determine whether the test results satisfy a portion of the deployment parameters for the computer product;
generate a weight of an importance of each of the plurality of test stages and a score corresponding to how well the portion of the deployment parameters were satisfied; and
automatically authorize deployment of the computer product based on whether the test results satisfy the portion of the deployment parameters, and when the weight of the importance of each of the plurality of test stages falls within a predetermined range of values and when the score is a passing score necessary for the deployment.

15. The non-transitory computer readable storage medium of claim 14, wherein the one or more instructions further cause the processor to:
automatically determine that a change in one section of code of the computer product performed to correct a defect has caused at least one of the following:
another section of code of the computer product to malfunction,
a bug into another code section of the computer product, and
one or more components of the computer product to fail that operated properly prior to the changed in the one section of code.

16. The non-transitory computer readable storage medium of claim 14, wherein the one or more instructions further cause the processor to:
automatically reject deployment of the computer product when the test results fail to satisfy the deployment parameters.

17. The non-transitory computer readable storage medium of claim 14, wherein the computer product is an application.

18. The method of claim 14, wherein the information includes one or more of:
a metric from a continuous integration stage, a metric from a code compilation stage, a metric from a unit test stage, and a metric from a code coverage stage.

19. The non-transitory computer readable storage medium of claim 17, wherein the one or more instructions further cause the processor to:
    automatically deploy the application to an entity when deployment is automatically authorized, wherein the entity is a cloud service provider, a network, or a client device.

\* \* \* \* \*